United States Patent
Vetrovec

[19]
[11] Patent Number: 6,154,478
[45] Date of Patent: Nov. 28, 2000

[54] CHEMICAL OXYGEN-IODINE LASER (COIL)/CRYOSORPTION VACUUM PUMP SYSTEM

[75] Inventor: Jan Vetrovec, Thousand Oaks, Calif.

[73] Assignee: The Boeing Company, Seal Beach, Calif.

[21] Appl. No.: 09/107,251

[22] Filed: Jun. 30, 1998

[51] Int. Cl.[7] .................................................. H01S 3/095
[52] U.S. Cl. ............................. 372/89; 372/89; 372/54; 372/34
[58] Field of Search .................................. 372/89, 54, 34

[56] References Cited

U.S. PATENT DOCUMENTS

| | | | |
|---|---|---|---|
| 3,668,881 | 6/1972 | Thibault et al. | 62/55.5 |
| 3,879,680 | 4/1975 | Naismith et al. | 331/94.5 |
| 3,992,685 | 11/1976 | Ogren et al. | 331/94.5 |
| 4,494,381 | 1/1985 | Lessard | 62/55.5 |
| 4,514,698 | 4/1985 | Blumenthal et al. | 330/4.3 |
| 4,607,493 | 8/1986 | Sukenobu | 62/55.5 |
| 4,718,241 | 1/1988 | Lessard et al. | 62/55.5 |
| 4,979,369 | 12/1990 | Larin et al. | 62/55.5 |
| 5,005,363 | 4/1991 | Larin | 62/55.5 |
| 5,014,517 | 5/1991 | Larin et al. | 62/55.5 |
| 5,161,382 | 11/1992 | Missimer | 62/46.1 |
| 5,974,072 | 10/1999 | Hartlove et al. | 372/89 |

OTHER PUBLICATIONS

K.R. Newton and R.B. Bernstein, "Cryosorption–pumped cw chemical laser," Applied Phys. Lett. 33(1), Jul. 1, 1978, pp. 47–49.

Rene A. Haefer, "Cryopumping Theory and Practice" Chptr. 5: Cryosorption on Porous Solids, 1989, pp. 107–119, Clarendon Press Oxford.

*Primary Examiner*—Frank G. Font
*Assistant Examiner*—Delma R. Flores Ruiz
*Attorney, Agent, or Firm*—Lawrence N. Ginsberg

[57] ABSTRACT

A high-capacity cryosorption vacuum pump system for a light-weight and compact chemical oxygen-iodine laser. The cryosorption vacuum pump system included a gas chiller and a bed of zeolite or other suitable sorption material. Gas exhausted from the chemical oxygeniodine laser is first chilled to about 100 degrees Kelvin and the condensable gases are removed. Cold and dry gas is then adsorbed onto a bed zeolite cooled to a temperature of approximately 80 degrees Kelvin. The zeolite bed uses a suitable zeolite material preferably in a granulated form and configured in layers several millimeters to several centimeters thick to provide an exposed surface of suitable size. The zeolite is enclosed in a suitable vacuum vessel and thermally insulated. Chilling of the zeolite is accomplished by a contact with suitable cryocooled surfaces or by exposing the zeolite to a cold light noble gas. When the sorption capacity of the zeolite is exhausted, the cryosorption vacuum pump can be regenerated by allowing the zeolite and the gas chiller to warm up and liberate gas. Regeneration can be expedited by heating the zeolite and the gas chiller with electric heaters, by flowing warm dry gas through the zeolite bed or exposing the zeolite to electromagnetic radiation. Gas liberated in the regeneration process is removed from the vacuum vessel by a suitable vacuum pump. The cryosorption vacuum pump system is a compact light-weight system which provides effective vacuum pumping for the chemical laser. In addition, the cryosorption vacuum pump safely contains all of the laser exhaust gas, thereby eliminating concerns over thermal signature, visible clouds of steam, excessive noise level, or safety hazards associated with laser gas exhausted into atmosphere.

23 Claims, 3 Drawing Sheets

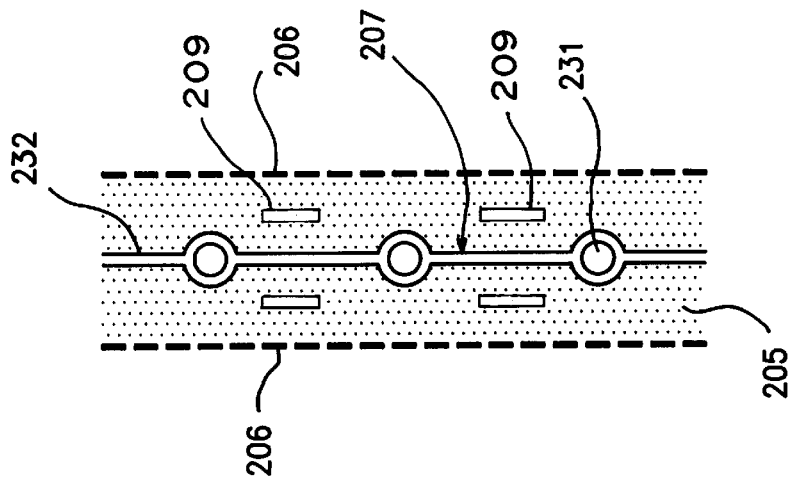
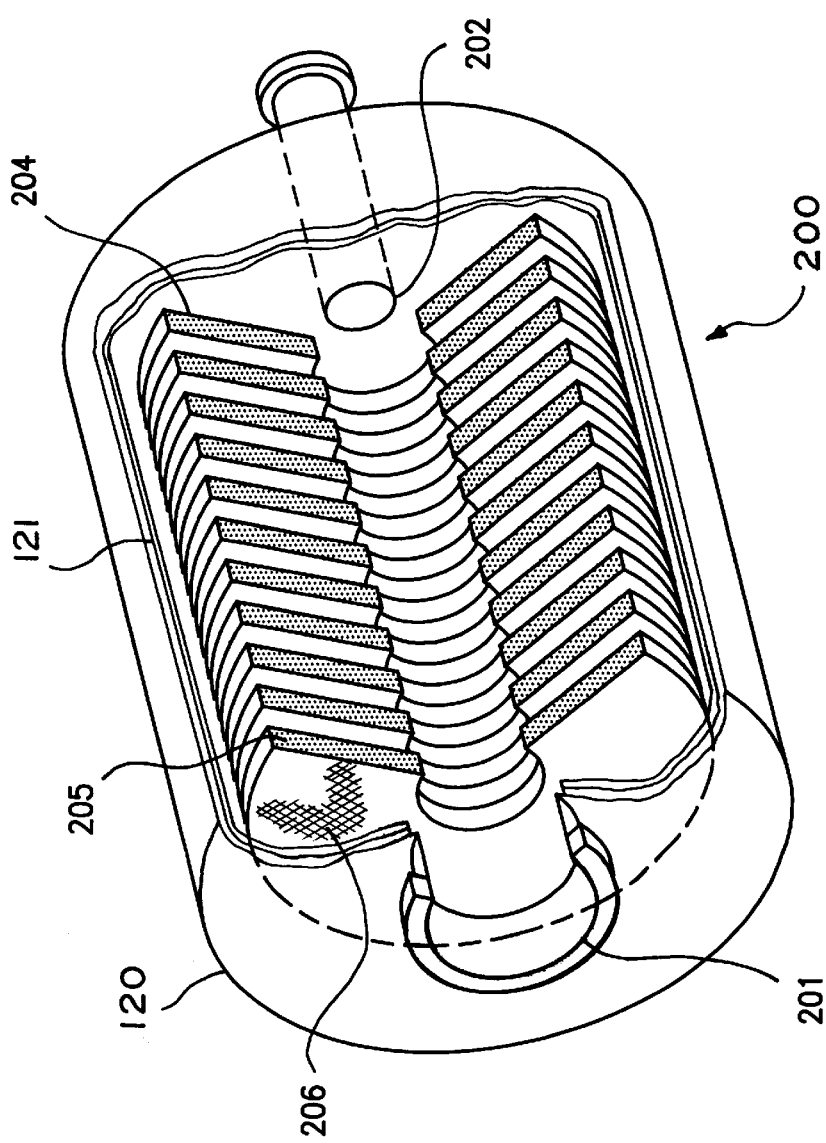
FIG. 4
FIG. 3

CHEMICAL OXYGEN-IODINE LASER (COIL)/CRYOSORPTION VACUUM PUMP SYSTEM

BACKGROUND OF THE INVENTION

1. Field of the Invention

The present invention relates to high-capacity cryosorption vacuum pumps for high-energy chemical lasers and more particularly to a vacuum pump system for a Chemical Oxygen-Iodine Laser (COIL).

2. Description of the Related Art

While not limited thereto, the present invention is particularly adapted for use with a high-power Chemical Oxygen-Iodine Laser intended for military applications. In chemical lasers, chemical reactions are used to produce exited atoms or molecules in a flow of suitable mixture of rarefied gases. Gas containing excited species is flowed through a laser cavity where optical energy is extracted from the excited species by means of an optical resonator. Required flow throughput and pressure are produced by vacuum pumps which draw the gas mixture through the laser cavity. High-energy chemical lasers for military applications often produce hundreds of kilowatts of optical power. The corresponding gas throughput in the range of 10–100 Torr pressure requires vacuum pumps with pumping speeds on the order of several hundred thousand liters per second. Military applications for high-power chemical lasers include tactical air defense which necessitates deployment of laser weapons in forward positions on the battlefield. Such laser weapons must be transportable and, therefore, of limited size and weight. In addition, the laser weapon should be concealable and undetectable by the enemy.

High-energy chemical lasers can be classified as either 1) hydrogen-halide or 2) Chemical Oxygen-Iodine Laser (COIL). Hydrogen-halide lasers typically involve a reaction of hydrogen and/or deuterium with fluorine, chlorine, bromine or iodine in diluent gases of nitrogen, helium, or alike, to produce hydrogen and/or deuterium halide molecules in excited vibrational states from which laser energy can be extracted. Exhaust from the laser cavity of a hydrogen-halide laser is typically a mixture of gases at high temperature (up to 1000 degrees Centigrade) including HF (and/or DF), $N_2$, and possibly small amounts of $H_2$ (and/or $D_2$), $O_2$ and $H_2O$.

On the other hand, COIL lasers typically involve reaction of chlorine in diluent gases such as nitrogen or helium, with aqueous solution of alkaline hydrogen peroxide to produce intermediate excited specie known as singlet delta oxygen. Singlet delta oxygen is subsequently mixed with iodine vapor to generate iodine atoms in electronically excited state and suitable for extraction of laser energy. Exhaust from a COIL laser cavity is typically a mixture of gases at near ambient temperature including nitrogen or helium and oxygen with small amounts of chlorine, iodine, and water.

In laboratory practice, mechanical vacuum pumps, roots blowers, and steam ejectors are used to maintain flow conditions in chemical lasers. Gas exhausted from chemical lasers often contains hazardous materials such as iodine, chlorine, fluorine, hydrogen and hydrogen fluoride. In order to prevent the release of such materials into atmosphere the laser exhaust gas must be scrubbed. Mechanical pumps with their concomitant scrubbers are too heavy and bulky for use in a transportable, field-deployable high-power laser. To overcome the size and volume limitations of mechanical pumps, Naismith et al, in U.S. Pat. No. 3,879,680 proposed a decontamination-capable combustion-driven ejector for a hydrogen fluoride laser. However, ejectors, although smaller in size and weight than corresponding mechanical pumps, are still excessively large and heavy for use in a transportable COIL where low cavity pressure necessitates two-stage pumping. Furthermore, operation of ejectors is typically accompanied by acoustic noise and liberation of large amounts of hot gases and/or steam into the atmosphere which significantly reduce concealment and increase detectability of the high-power laser weapon.

A vacuum pump capable of pumping and safely containing exhaust from a hydrogen fluoride laser has been disclosed by Ogren et al. in the U.S. Pat. No. 3,992,685. Pumping action here is produced by chemically reacting laser cavity exhaust gases with titanium, zirconium, and other reactive metals at elevated temperature. The laser exhaust is thus safely contained within the vacuum pump envelope. A refinement of Ogren's device and process was disclosed by Blumenthal et al. in the U.S. Pat. No. 4,514,698 where pumping action is produced by a combination of condensation (to remove HF and/or DF), chemical reaction with Ti, Zr, etc. (to remove $O_2$, $H_2$ and/or $D_2$) and cryogenic adsorption to remove nitrogen. A considerable disadvantage of Ogren's and Blumenthal's processes is the need to separately remove constituents from the flow in several steps some of which require high temperature reactions with metals. Since some of the reactions with metals are difficult to reverse it can be deemed that neither Ogren's nor Blumenthal's apparatus could be easily regenerated. Blumenthal describes cryosorption of nitrogen only as a part of the multi-step pumping process whereas oxygen is pumped by reaction with hot metals. In summary, the inventions of Ogren and Blumenthal are very specific for use with the hydrogen-halide laser and no reference is made to show how they may be adapted to COIL.

Cryosorption pumps of various designs have been used in the vacuum industry for many years (Cryopumping Theory and Practice, Chapter 5, by Rene A. Haefer, Claredon Press, Oxford, UK, 1989). Sorption pumps function by the physical adsorption of gases at the surface of molecular sieves or other sorption material (e.g. activated $Al_2O_3$ or charcoal). Such materials have an extraordinarily large specific surface area per unit of mass (hundreds of $m^2/gram$). Correspondingly, the capability of gas adsorption is considerable, up to 200 milligrams of nitrogen per gram of synthetic zeolite (Linde 4A, manufactured by Union Carbide Corp., Danbury, Conn.) at the temperature of liquid nitrogen (77 degrees Kelvin). A variety of natural and synthetic zeolites are now commercially available. Sorption capacity of zeolites (maximum amount of gas that can be stored) is highly dependent on zeolite temperature and pressure of gas above the sorption surface. In particular, at a constant pressure, the sorption capacity increases with decreasing temperature while at a constant temperature the sorption capacity decreases with decreasing pressure. For example, at a pressure of 10 Torr, changing the temperature from 293 degrees Kelvin to 77 degrees Kelvin increases the capacity of zeolite (e.g. Linde 4A) to sorb to nitrogen more than 200 times. Furthermore, during the sorption process the sorption effect decreases with increased coverage of the sorption sites.

The sorption capacity of zeolites is also highly dependent on the gas to be pumped. In general, light inert gases are hardly pumped at all. For example, the capability of synthetic zeolite Linde 4A to pump helium or neon at a temperature of 80 degrees Kelvin is several orders of magnitude lower than for COIL laser gases such as oxygen and nitrogen.

In general, cryosorption vacuum pumps can be classified as roughing and hard vacuum type. Cryosorption vacuum pumps for roughing applications are capable of evacuating vacuum chambers from atmospheric pressure down to a fraction of a Torr. These devices are usually quite simple in construction, comprising a metal flask containing zeolite. Vacuum suction is obtained at the flask throat as the flask is immersed into a bath of liquid nitrogen. The pumping process exerts a heat load to the zeolite. The heat load is due to a change in enthalpy of the gas as it is being cooled to the temperature of the zeolite and release of the heat of sorption. Since the zeolite can adsorb atmospheric oxygen and nitrogen only when cold, the pumping speed of a zeolite roughing pump depends on its effectiveness to reject the heat load to the liquid nitrogen. The problem of maintaining the zeolite at low temperature is further exasperated by zeolite's poor thermal conductivity. Zeolite roughing pumps are normally used in applications where time is not critical. Pump-down times on the order of 10–60 minutes are acceptable.

Cryosorption vacuum pumps for hard vacuum applications (below $10^{-3}$ Torr) normally encounter a lower head load than roughing pumps. This is both due to the reduced gas density and a refrigerated baffle (usually a chevron style) which is normally located at the intake to the pump and cools the incoming molecular flow of gas. Various design of such pumps have been disclosed in prior art, for example by Thibault et al. in the U.S. Pat. No. 3,668,881; Lessard et al. in the U.S. Pat. Nos. 4,494,381 and 4,718,241; Sukenobu in the U.S. Pat. No. 4,607,493, and Larin et al. in the U.S. Pat. Nos. 4,99,369, 5,005,363 and 5,014,517. It should also be noted that cryosorption vacuum pumps for hard vacuum are not suitable for operation at high pressures (significantly above $10^{-3}$ Torr) due to their inability to reject concomitant increase in heat load.

A hydrogen halide laser entirely pumped by cryosorption has been described by Newton et al. in the article entitled: "Cryosorption-pumped cw chemical laser" which was published in the Applied Physics Letters vol. 33(1), on Jul. 1, 1978. Newton et al. used a commercially available zeolite sorption pump cooled by liquid nitrogen to operate a small (200–300 miliwatt) hydrogen halide laser at cavity pressures of a few Torr and flow rates of several milimoles per second for periods of up to 6 hours. Because of its low flow rates, Newton's cryosorption pump has not experienced problems with rejection of heat of adsorption. However, Newton's concept is not scalable to a high-power chemical laser with its concomitant high flowrates.

In summary, a suitable cryosorption vacuum pump system for a COIL requires the capability of handling relatively short (about 100 second) duration gas flow with a throughput on the order of 10–100 mol/s at about 10 to 30 Torr pressure. Gases to be pumped are expected to be at near ambient temperature (300 to 400 degrees Kelvin), possibly moist (containing water vapor and possibly particulates), and contain corrosive and hazardous materials such as iodine and chlorine. The cryosorption vacuum pump system should be light-weight, compact, economical in refrigerant use, environmentally safe, and have a short regeneration time. Devices and methods disclosed in the prior art cannot meet these requirements simultaneously. A new cryosorption vacuum pump system, one specific for the needs of the chemical oxygen-iodine laser, is needed.

OBJECTS AND SUMMARY OF THE INVENTION

It is therefore a principal object of this invention to provide a high capacity sorption pump for a chemical laser.

It is another object of this invention to reduce the size and weight of the vacuum pump for a chemical oxygen-iodine laser.

It is another object of this invention to safely contain the exhaust from a chemical oxygen-iodine laser.

It is a further object of this invention to improve operational personal and environmental safety of a high-power chemical oxygen-iodine laser.

It is yet another object of this invention to reduce the noise produced by the operation of a high-power chemical oxygen-iodine laser.

It is still another object of this invention to improve the transportability of a high-power chemical oxygen-iodine laser weapon system.

It is yet another object of this invention is to reduce detectability of a field operable chemical oxygen-iodine laser weapon.

In accordance with the present invention, a cryosorption vacuum pump system is provided for chemical lasers, in particular for the Chemical Oxygen-Iodine Laser. The cryosorption vacuum pump system has significant advantages over prior art, most notable of which are 1) high pumping speed capability at high pressure, 2) complete containment of pumped gases, 3) in-situ regeneration of the cryosorption material, and 4) compact and light-weight package.

The cryosorption vacuum pump system comprises a gas chiller, zeolite bed, vacuum vessel which encloses the gas chiller and zeolite bed, means to refrigerate the gas chiller and zeolite bed, means to warm-up the gas chiller and zeolite bed, auxiliary mechanical pumps, plurality of valves, interconnecting lines and controls. The system has two principal modes of operation; 1) the pump mode, during which the zeolite is capable of sorbing gas and 2) the regeneration mode, during which the zeolite releases stored gas for a transfer to outside the system. During the pump mode, the gas chiller receives gas flow from chemical laser, chills the flow to about 100 degrees Kelvin and removes condensable gases and vapors therefrom by condensing and/or freezing them onto cold surfaces. Cold dry gas is then directed onto a bed of zeolite cooled to a temperature of approximately 80 degrees Kelvin. The zeolite bed uses a suitable zeolite sorption material preferably in a granulated form and configured in layers several millimeters to several centimeters thick to provide a large exposed surface to the sorbed gas. During the regeneration mode, with the pump system isolated from the laser, the gas chiller and the zeolite bed are gradually warmed up to allow release of trapped gas. Heat required to warm-up the gas chiller and the zeolite bed may be provided by electric heating, flowing warm inert gas or other suitable means. Released gas is removed from the vacuum envelope of the cryosorption pump system by an auxiliary vacuum pump. When the gas chiller and the zeolite bed are out-gassed to a desirable level, auxiliary vacuum pumps can be turned off, and the sorption cycle can be initiated by cooling the gas chiller and the zeolite bed down to a temperature of approximately 80 degrees Kelvin.

In the preferred embodiment of the invention, the zeolite bed is configured as a plurality of thin annular containers filled with zeolite and having walls with apertures that allow pumped gas to enter the containers and become sorbed by the zeolite. The containers are enclosed in a suitable vacuum enclosure and configured in a coaxial array with gaps between adjacent containers to allow a flow of pumped gas. Suitable thermal insulation can be provided between the containers and the vacuum vessel walls in order to minimize heat load to the zeolite and economize on the use of cryorefrigerant. The laser gas enters the vacuum enclosure, flows into the spaces between adjacent containers, and through apertures in container walls where it comes into contact with the zeolite therein.

These and other objects, advantages and novel features of the present invention will become apparent from the following detailed description of the invention when considered in conjunction with the accompanying drawings.

BRIEF DESCRIPTION OF THE DRAWINGS

FIG. 3 is a perspective view, partially cutaway, of a vacuum vessel containing zeolite.

FIG. 4 shows an enlarged cross-sectional view of a section of a zeolite container.

The same elements or parts throughout the figures are designated by the same reference of characters.

DETAILED DESCRIPTION OF THE PREFERRED EMBODIMENT

Figure 1:
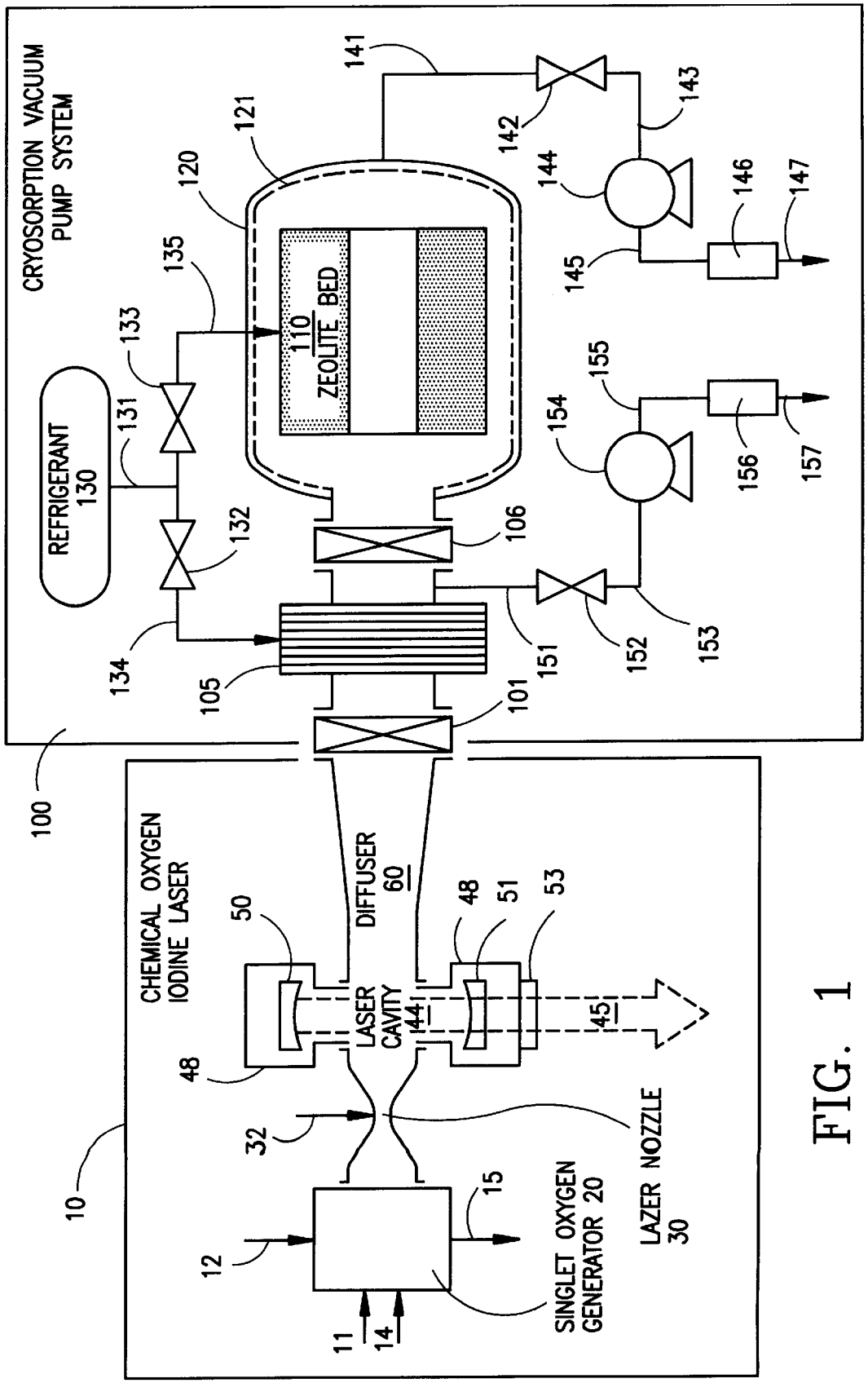
FIG. 1 is a schematic illustration of the cryosorption vacuum pump system of the present invention with an associated COIL.

Referring now to the drawings and the characters of reference marked thereon, FIG. 1 illustrates a preferred embodiment of the Chemical Oxygen-Iodine Laser (COIL)/Cryosorption Vacuum Pump System of the present invention, which includes a COIL 10 and a cryosorption vacuum pump 100. COIL 10 utilizes a reaction of basic hydrogen peroxide liquor 12 and chlorine gas 11 which are supplied to a singlet oxygen generator 20 to produce excited oxygen gas in a metastable state known as the singlet delta oxygen ($O_2(^1\Delta)$) according to the reaction

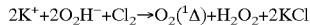

$$2K^+ + 2O_2H^- + Cl_2 \rightarrow O_2(^1\Delta) + H_2O_2 + 2KCl$$

Nitrogen gas 14 may be also provided to the singlet oxygen generator as a diluent and not taking part in the chemical reaction therein. Static pressure inside the singlet oxygen generator is about 30 to about 100 Torr. Depleted basic hydrogen peroxide liquor is discharged from the singlet oxygen generator 20 through line 15. The produced $O_2(^1\Delta)$ is separated from the liquor and diluted by the nitrogen gas 14. The mixture of $O_2(^1\Delta)$, nitrogen diluent and unreacted chlorine is directed from the singlet oxygen generator 20 into a laser nozzle 30 where it is mixed with a continuous supply 32 of iodine vapor carried by a stream of nitrogen gas. This process facilitates an energy transfer from the $O_2(^1\Delta)$ to the iodine, by dissociating iodine molecules into atoms and bringing the iodine atoms to an electronically excited state known as $^2P_{1/2}$. Flow in the diverging part of laser nozzle 30 is aerodynamically accelerated to a supersonic velocity of typically Mach 2. Supersonic flow from nozzle 30 enters the laser cavity 44 containing an optical resonator including mirrors 50, 51 in a vacuum enclosure 48. Using an optical feed back provided by the mirrors a coherent laser light can be extracted from the inverted population of the exited iodine atoms in the supersonic flow. An outcoupled beam of coherent laser light 45 is passed through the window 53 to the outside of the vacuum envelope. During this process the excited iodine atoms decay from a high energy state $^2P_{1/2}$ to a lower energy state $^2P_{3/2}$ while releasing photons at 1.315 micrometer wavelength. Chemical oxygen-iodine laser with a subsonic (rather than supersonic) flow was disclosed by McDermott in the U.S. Pat. No. 4,267,526.

Depleted laser gas flows from the laser cavity 44 into the diffuser 60. Additional nitrogen purge gas can be used to protect optical components inside the enclosure 48. Such purge gas is then added to the flow in the cavity 44. The flow entering the diffuser 60 is a gas mixture containing approximately 70% $N_2$, 27% $O_2$, 1% $Cl_2$, 1% $I_2$ and 1% $H_2O$ vapor. The diffuser 60 decelerates the flow and allows recovery of static pressure. Static pressure at the downstream end of the diffuser 60 is typically in range of about 5 to 20 Torr and the corresponding flow velocity is about Mach 0.1 to about Mach 0.3. Continuous flow of gas from the singlet oxygen generator 20 up to the end of the diffuser 60 under vacuum conditions is made possible by continuous suction provided by the cryosorption vacuum pump system 100 of the present invention.

Decelerated flow from the diffuser 60 enters the cryosorption vacuum pump 100 through an isolation valve 101 in an open position. The flow is directed into a gas chiller 105. The chiller 105 includes a plurality of surfaces cooled to a temperature around 80 degrees Kelvin. These surfaces are so arranged and disposed so as to chill the incoming gas flow to approximately 100 degrees Kelvin while condensing and/or freezing out chlorine gas, iodine and water vapor out of the flow and trapping them onto the cooled surfaces. Cold and dry gas containing only nitrogen and oxygen is directed from the gas chiller 105 through an isolation valve 106, in an open position, and toward a zeolite bed 110 in a vacuum vessel 120. The zeolite bed 110 uses a suitable zeolite sorption material such as the synthetic zeolite Linde 4A made by Union Carbide Corporation cooled to a temperature of approximately 80 degrees Kelvin to adsorb and trap the incoming mixture of nitrogen and oxygen gas. The zeolite is preferably provided in granular form and is configured in layers several millimeters to several centimeters thick to provide a large exposed surface to the sorbed gas. Limiting the size of the granules and thickness of the zeolite layers provides a more direct path for the sorbed gas to travel to sorption sites in the zeolite, thereby reducing impedance to the flow and increasing effective pumping speed of the zeolite bed 110. Preferred configurations of the zeolite bed 110 will be discussed in the text below.

Cooling the gas chiller 105 and the zeolite bed 110 to the required temperature is accomplished by a suitable cryorefrigerant, such as liquid nitrogen or liquid argon, stored in dewar 130. When cooling is required the cryorefrigerant is provided from dewar 130 through line 131 to refrigerant control valves 132 and 133 which respectively control flow through line 134 to the gas chiller 105 and through line 135 to the zeolite bed 110. The cryorefrigerant can be either gravity fed, pump fed, or fed by dewar pressure. Refrigeration can be realized by boiling-off cryorefrigerant inside heat exchangers (not shown) within the gas chiller 105 and the zeolite bed 110. Alternately, the refrigerant can be recirculated between the heat exchangers and external boilers. Other schemes for providing refrigeration of the laser gases in the gas chiller and the zeolite bed can be realized as is well known to those skilled in the art of refrigeration. In either case, the supply of cryorefrigerant must be sufficient to cool down the gas chiller 105 and zeolite bed 110 to the required temperature, overcoming thermal leaks, rejecting the heat released by cooling and condensing and/or freezing out gases in the gas chiller 105 and rejecting the heat released by cryosorption onto the zeolite bed 110. A heat shield 121 is positioned between the zeolite bed 110 and the vacuum vessel 120. The heat shield reduces radiative and convective heat load to the zeolite bed 110. It can be constructed of multiple layers of polished sheet metal with small gaps therebetween, or of multiple layers of aluminum coated mylar, or other suitable means used in the cryogenic industry. In order to reduce convective heat load to the zeolite bed 1 10, the interior of the vacuum vessel 120 can be coated or lined with a thermally insulating material, for example Teflon.

During operation of the chemical oxygen-iodine laser 10 gases are drawn through the laser cavity 44 by suction provided by gas sorption onto zeolite material in the zeolite bed 110. With increasing quantity of sorbed gas and constant temperature of the zeolite material the pressure inside vacuum enclosure 120 steadily rises. At a point where the pressure differential between the vacuum enclosure 120 and the cavity 44 is no longer sufficient to sustain required supersonic flow through said cavity, the sorption capacity of the zeolite bed 110 is deemed exhausted, and operation of the laser 10 is terminated by shutting off flows of chlorine 11, nitrogen 14, and iodine 32.

The cryosorption vacuum pump system 100 can be regenerated and made available for the next sorption cycle by removing the sorbed gas. The regeneration process is started by isolating the gas chiller 105 and the zeolite bed 110 from the laser 10 by closing the isolation valves 101 and 106. Then the supply of cryorefrigerant is terminated by closing the control valves 132 and 133. Finally, the gas chiller 105 and the zeolite bed 110 are allowed to warm up. The warm-up process can be accelerated by, for example, application of external heat either by electric heaters (not shown), recirculation of warm fluid through heat exchangers within the gas chiller 105 and the zeolite bed 110, microwave heating, dielectric heating, or by flowing a warm gas through the gas chiller 105 and the zeolite bed 110. Details of the preferred methods will be explained in the text below. Depending on the choice of cryosorption media, most of the sorbed gas can be released with only modest increase in temperature. For example, warming the zeolite Linde 4A from 78 degrees Kelvin to 180 degrees Kelvin can release over 90% of sorbed oxygen and nitrogen. Allowing removal of sorbed gas with only modest temperature increase economizes on use of cryorefrigerant. The temperature of the gas chiller 105 has to be increased substantially higher to allow removal of condensed and/or frozen chlorine gas and water vapor. Desorbed gas is removed from the system by means of auxiliary vacuum pumps 144 and 154. With the control valve 142 in open position the vacuum pump 144 draws gas from the vacuum enclosure 120 through line 141 and 143, and exhausts the gas through line 145 into filter 146. The filter 146 traps hazardous materials such as iodine and chlorine which may be found in trace amounts in the flow through line 145. Clean gas is then exhausted through line 147 into the atmosphere. Gas and vapor liberated from the gas chiller are removed in a similar fashion. With the control valve 152 in an open position the vacuum pump 154 draws gas from gas chiller 105 through line 151 and 153, and exhausts the gas through line 155 into filter 156. The filter 156 traps hazardous materials such as iodine and chlorine which may be found in substantial amounts in the flow through line 155. Clean gas is then exhausted through line 157 into the atmosphere. When the gas chiller 105 and the zeolite bed 110 have been outgassed to a desirable level, the control valves 142 and 152 are closed, auxiliary vacuum pumps 144 and 154 are turned off, and the flow of refrigerant to the gas chiller 105 and zeolite bed 110 is restored by opening valves 132 and 133. After the gas chiller 105 and the zeolite bed 110 reach the desired temperature, the system 100 is deemed regenerated and available to provide vacuum suction for the laser 10. At this point the isolation valves 101 and 106 can be opened and laser operation may commence. It should be noted that the regeneration process may last substantially longer than operation of the laser. For example, the laser may operate typically for only 100 seconds during which several hundred to several thousand mols of oxygen-nitrogen mixture are sorbed by the cryosorption pump system 100. The subsequent regeneration cycle may last from several minutes to several hours.

Figure 2:
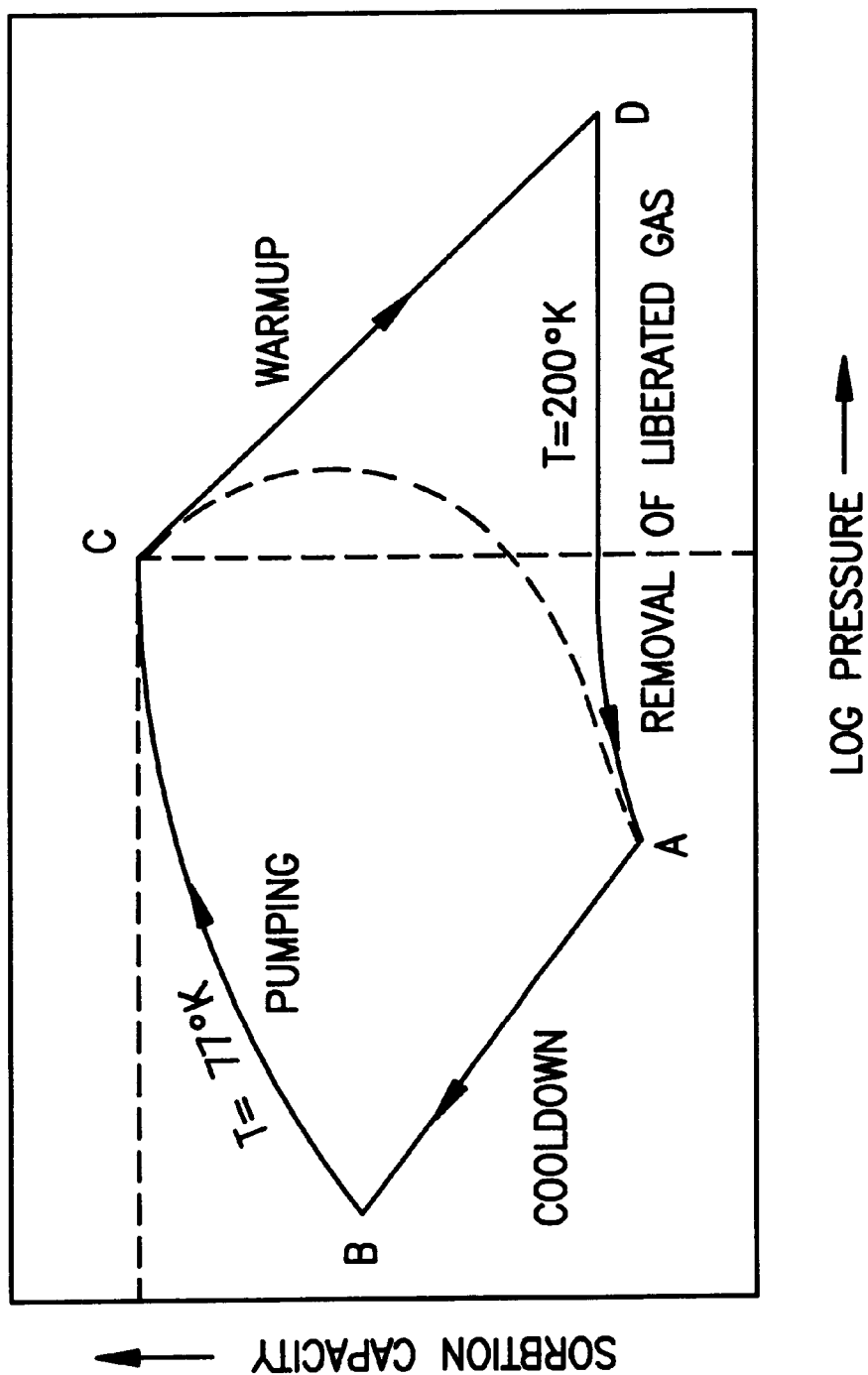
FIG. 2 is a plot of Sorption Capacity versus Log Pressure to illustrate the working function of the zeolite used in conjunction with the invention.

FIG. 2 is an illustrative diagram of the working function of the zeolite bed using the zeolite Linde 4A molecular sieve for a mixture of oxygen and nitrogen. The diagram plots the sorption capacity of the zeolite bed 110 versus logarithm of the pressure inside the vacuum enclosure 120. Sorption capacity is defined herein as the maximum amount of gas that can be sorbed onto the zeolite under specified pressure and temperature conditions of the gas. At point A there is no gas flow into the vacuum enclosure 120. The partial pressure of $O_2$-$N_2$ mixture inside the enclosure 120 is substantially less than 1Torr and the zeolite is at a temperature of 200 degrees Kelvin. Under these conditions zeolite Linde 4A contains only a small fraction of its sorption capacity at 77 degrees Kelvin. Starting from point A conditions and cooling the zeolite from 200 to 77 degrees Kelvin (point B) simultaneously increases zeolite sorption capacity and reduces the partial pressure of $O_2$-$N_2$ mixture inside the enclosure 120. At point B the zeolite is suitable for efficient cryosorption. Operation of the laser 10 includes flowing a mixture $O_2$-$N_2$ gases into the zeolite bed 110 where the mixture gets adsorbed. Providing that the heat released during adsorption is rejected into the refrigerant or absorbed by the thermal mass of the zeolite, the temperature of the zeolite during the sorption process remains essentially constant. With increased quantity of gas occupying sorption sites in the zeolite the partial pressure of $O_2$-$N_2$ mixture inside the enclosure 120 steadily rises, thereby slightly increasing the sorption capacity. When the partial pressure of $O_2$-$N_2$ mixture reaches the limit at point C the pressure differential between the enclosure 120 and the laser cavity 44 cannot sustain a supersonic flow through the cavity and the laser operation is terminated. With the isolation valves 101 and 106 in closed position the zeolite is allowed to warm-up to about 200 degrees Kelvin and liberate most of the adsorbed gas. During this process the pressure inside the enclosure 120 steadily rises up to point D. Liberated gas is removed by the auxiliary vacuum pump 144 until the pressure inside the enclosure drops to below about 1 Torr, thereby returning the system to the starting point A. It should be understood that the FIG. 2 diagram represents an idealized process and is intended for illustration only. For example, under realistic operating conditions a constant zeolite temperature cannot be easily maintained and, as a result, the actual working diagram of the zeolite bed 110 is somewhat more complex. Furthermore, in practice it is desirable to remove desorbed gas from the vacuum enclosure 120 during the desorption process facilitated by the warm-up. This can be represented by a broken curve starting at point C and leading to point A in FIG. 2.

FIG. 3 shows the preferred embodiment of a cryosorption assembly 200, containing a zeolite bed. The zeolite bed comprises a coaxial array of thin, washer-like annular containers 204 filled with sorption material 205. The sorption material 205 is preferably a synthetic zeolite such as Linde 4A provided in a granular form with a grain size of approximately 1 millimeter. Zeolite may be provided either as sintered particles or an agglomeration of loose particles.

Thickness of the containers 204 is typically from several millimeters to several centimeters and is selected primarily to reduce impedance to gas flowing to sorption sites within the zeolite 205. The containers 204 have gaps therebetween to allow a flow of gas reaching both sides of the containers. The gap between adjacent containers 204 is roughly the same size as the thickness of the containers 204. Walls 206 of the containers 204 are constructed from porous, perforated or a screen-like material having pores or apertures which are substantially smaller than the size of the zeolite grains located inside the containers. The pores or apertures are intended to provide a path through which gas can flow into and out of the containers without suffering significant pressure loss. The containers 204 are enclosed in a vacuum enclosure 120. The enclosure 120 has an inlet port 201 and outlet port 202. The enclosure 120 which is typically at room temperature has its internal walls lined with thermal shield 121 which reduces radiative and convective heat load to the containers 204 which operate at reduced temperature. During a sorption cycle the zeolite containers 204 and the zeolite material 205 inside are maintained at a temperature of approximately 78 degrees Kelvin and the outlet port 202 is closed. A dry mixture of oxygen and nitrogen free of condensable vapors and gases, and chilled to about 100 degrees Kelvin, enters the vacuum enclosure 120 through the inlet port 201, flows through central openings in containers 204 and into the gaps therebetween, through the permeable walls 206 and is sorbed onto zeolite 205. During a desorption (i.e. regeneration) cycle, the inlet port 201 is closed and the outlet port 202 is opened. The zeolite 205 is warmed up to approximately 200 degrees Kelvin to release sorbed gases. Possible approaches to warming the zeolite include electric heating with heating elements 209 in contact with the zeolite 205, heating with warm fluid acting through a heat exchanger in contact with the zeolite, or by flushing the zeolite with warm gas.

A suitable configuration of a heat exchanger, designated generally as 207, embedded in zeolite 205, is shown in FIG. 4. The heat exchanger 207 comprises fluid passages 231 and fins 232 in contact with the zeolite 205. By alternating between warm and cold heat transfer fluid in passages 231 this kind of heat exchanger can be used to warm the zeolite 205 during the regeneration cycle chill the zeolite during the sorption cycle. Flushing the zeolite 205 with gas can be performed by introducing a warm dry gas such as nitrogen or argon inside the vacuum enclosure 120 (FIG. 3) in the proximity of the inlet port 201, the gas flowing around and into containers 204, warming up the zeolite 205 therein, and allowing the zeolite to release adsorbed gas. Desorbed gas and flush gas (if used) are removed through the outlet port 202 and fed into a auxiliary vacuum pump 144. During a sorption cycle the zeolite 205 is chilled to a temperature of approximately 78 degrees Kelvin. In preparation for a sorption cycle the vacuum enclosure 120 is evacuated prior to chilling the zeolite. The zeolite 205 can be chilled by applying a cryorefrigerant into a heat exchanger in contact therewith as already explained above or by flushing the zeolite with a cold light noble gas. Since light noble gases such as helium, neon, and to some degree also argon are not significantly sorbed by zeolites, such gases can be used to flush-chill the zeolite without filling zeolite sorption sites. Flushing the zeolite with light noble gas for the purpose of heating or chilling can be made more effective if during the flush process the central openings in the containers 204 are mechanically blocked, thereby forcing the flush gas to flow through said containers and zeolite 205 therein.

The heat leased during the sorption process is deposited into the zeolite and, unless this heat is rejected into refrigerant, the zeolite temperature will rise. In order to tolerate such a temperature rise without significantly reducing sorption capacity of the zeolite, the zeolite can be initially chilled to a substantially lower temperature than the normal operating temperature of approximately 80 degrees Kelvin. During the sorption process the heat of sorption is rejected by the thermal mass of the zeolite and the zeolite temperature is allowed to rise up to about 80 degrees Kelvin.

The sorption material used in the preferred embodiment of the invention is synthetic zeolite, but it is understood that the invention may use other sorption materials such as natural zeolites or activated charcoal.

Obviously, many modifications and variations of the present invention are possible in light of above teachings. It is therefore understood that, within the scope of the appended claims, the invention may be practiced otherwise than as specifically described.

What is claimed and desired to be secured by Letters Patent of the United States is:

1. A Chemical Oxygen-Iodine Laser (COIL)/cryosorption vacuum pump system comprising:
   (a) a COIL including a laser cavity; and,
   (b) a cryosorption vacuum pump system for removing exhaust gases from said laser cavity at a rate and sufficiently low pressure to sustain lasing action, said cryosorption vacuum pump system, comprising:
      (i) a gas chiller assembly for chilling a flow of laser gases received from said laser cavity, said gas chiller removing condensable vapors therefrom, said condensable vapors including water and iodine, said gas chiller providing cold dry laser gases;
      (ii) a cryosorption assembly including a bed of cryosorption material for receiving and absorbing said cold dry laser gases from said gas chiller;
      (iii) means associated with said gas chiller assembly for refrigerating said gas chiller assembly;
      (iv) means associated with said cryosorption assembly for refrigerating said bed of cryosorption material; and
      (v) means for regenerating said gas chiller assembly and said cryosorption assembly by removing the condensable vapors and laser gases therefrom.

2. The COIL/cryosorption vacuum pump system of claim 1, wherein said COIL utilizes a diluent gas being selected from the class consisting of nitrogen and argon.

3. The COIL/cryosorption vacuum pump system of claim 1, wherein said cryosorption material is zeolite.

4. The COIL/cryosorption vacuum pump system of claim 1, wherein said cryosorption material comprises a bed of sintered particles.

5. The COIL/cryosorption vacuum pump system of claim 1, wherein said cryosorption material comprises an agglomeration of loose particles.

6. The COIL/cryosorption vacuum pump system of claim 1, wherein said cryosorption material is configured in layers 1 to 100 millimeters thick.

7. The COIL/cryosorption vacuum pump system of claim 1, wherein said cryosorption assembly, comprises:
   (a) a vacuum vessel;
   (b) a plurality of spaced containers contained within said vacuum vessel, each container having at least one wall with apertures, said at least one wall being sufficiently gas permeable to allow gas to flow into and out of the container without suffering significant pressure loss, said containers being spaced so as to avoid impeding gas flow from the COIL to said at least one wall;
   (c) cryosorption material contained within said containers; and (d) heat exchange elements in contact with said cryosorption material for refrigerating said cryosorption material.

8. The COIL/cryosorption vacuum pump system of claim 7, wherein said at least one wall comprises perforated sheet material.

9. The COIL/cryosorption vacuum pump system of claim 7, wherein said at least one wall comprises filament mesh.

10. The COIL/cryosorption vacuum pump system of claim 7, wherein said plurality of spaced containers are configured in a coaxial array, each container having a washer-like annular shape with substantially flat faces, wherein there is sufficient spacing between adjacent containers to allow gas flow to reach said flat faces of said containers.

11. The COIL/cryosorption vacuum pump of claim 7 wherein said heat exchange elements contain cryorefrigerants.

12. The COIL/cryosorption vacuum pump of claim 1, wherein said gas chiller comprises a heat exchanger cooled by liquid nitrogen.

13. The COIL/cryosorption vacuum pump of claim 1, wherein said bed of cryosorption material is refrigerated by flowing a cold light noble gas being selected from the class consisting of helium, argon and neon, therethrough.

14. The COIL/cryosorption vacuum pump system of claim 1, wherein said cryosorption assembly, comprises:
  (a) a vacuum vessel;
  (b) a bed of cryosorption material contained within said vacuum vessel; and
  (c) heat exchange elements contained within said vacuum vessel in contact with said bed of cryosorption material for refrigerating said cryosorption material.

15. A cryosorption vacuum pump system for use in a chemical laser to produce vacuum required to draw laser gain media gases through a laser cavity at a rate and sufficiently low pressure to sustain lasing action, said vacuum pump system, comprising:
  (a) a gas chiller assembly for chilling a flow of laser gases received from a laser cavity, said gas chiller removing condensable vapors therefrom, said gas chiller providing cold dry laser gases;
  (b) a cryosorption assembly including a bed of cryosorption material for receiving and absorbing said cold dry laser gases from said gas chiller;
  (c) means associated with said gas chiller assembly for refrigerating said gas chiller assembly;
  (d) means associated with said cryosorption assembly for refrigerating said bed of cryosorption material; and
  (e) means for regenerating said gas chiller assembly and said cryosorption assembly by removing the condensable vapors and laser gases therefrom.

16. A cryosorption assembly for a cryosorption vacuum pump system for use with a chemical laser, comprising;
  (a) a vacuum vessel;
  (b) a plurality of spaced containers contained within said vacuum vessel, each container having at least one wall with apertures, said at least one wall being sufficiently gas permeable to allow gas to flow into and out of the container without suffering significant pressure loss, said containers being spaced so as to avoid impeding gas flow from a chemical laser to said at least one wall;
  (c) cryosorption material contained within said containers; and
  (d) heat exchange elements in contact with said cryosorption material for refrigerating said cryosorption material.

17. The cryosorption assembly claim 16 wherein said containers are open trays.

18. A cryosorption assembly for a cryosorption vacuum pump system for use with a chemical laser, comprising;
  (a) a vacuum vessel;
  (b) a bed of cryosorption material contained within said vacuum vessel; and
  (c) heat exchange elements contained within said vacuum vessel in contact with said bed of cryosorption material for refrigerating said cryosorption material.

19. The cryosorption assembly of claim 18 wherein said cryosorption material is contained in open trays.

20. The cryosorption assembly of claim 18 wherein said cryosorption material is contained in a plurality of containers, said containers having at least one wall with apertures, said at least one wall being sufficiently gas permeable to allow gas to flow into and out of the container without suffering significant pressure loss, and said containers being spaced so as to avoid impeding gas flow from a chemical laser to said at least one wall.

21. The cryosorption assembly of claim 18 wherein said chemical laser comprises a COIL.

22. A method of operating a chemical Oxygen-Iodine laser (COIL)/cryosorption vacuum pump system, comprising;
  a sequence of pumping, regeneration and cool down cycles,
  said pumping cycle comprising the steps of:
    (a) flowing laser gases through a laser cavity of a COIL;
    (b) introducing said laser gases into a gas chiller of a cryosorption vacuum pump system for chilling the laser gases and removing condensable vapors therefrom;
    (c) flowing the resulting cold dry laser gases from the gas chiller into a cryosorption assembly, wherein the laser gases are adsorbed by cryosorption material within the cryosorption assembly; and
    (d) discontinuing the flow of laser gases through the laser cavity to terminate the pumping cycle;
  said regeneration cycle comprising the steps of:
    allowing the gas chiller and the cryosorption material to warm up and liberate condensed vapors and adsorbed gases, the liberated condensed vapors and adsorbed gases being removed from the cryosorption vacuum pump system; and
  said cool down cycle comprising the steps of:
    refrigerating the gas chiller to temperatures suitable for effective condensation and removal of condensable vapors contained in the laser gases; and
    refrigerating the cryosorption material to temperatures suitable for effective cryosorption.

23. The method of claim 22, wherein said regeneration cycle comprises removing said liberated condensed vapors and gases under vacuum conditions.

* * * * *